(12) United States Patent  
Juncker

(10) Patent No.: US 7,077,216 B2  
(45) Date of Patent: Jul. 18, 2006

(54) EARTH SCRAPER WITH TRACK APPARATUS

(75) Inventor: Kenneth J. Juncker, Mt. Vernon, IN (US)

(73) Assignee: ATI, Inc., Mt. Vernon, IN (US)

( * ) Notice: Subject to any disclaimer, the term of this patent is extended or adjusted under 35 U.S.C. 154(b) by 0 days.

(21) Appl. No.: 10/690,337

(22) Filed: Oct. 21, 2003

(65) Prior Publication Data

US 2005/0082070 A1 Apr. 21, 2005

(51) Int. Cl.  
*E02F 3/76* (2006.01)

(52) U.S. Cl. ................................. 172/799.5; 172/684.5

(58) Field of Classification Search ............. 172/684.5, 172/776, 777–799.5, 197, 199  
See application file for complete search history.

(56) References Cited

U.S. PATENT DOCUMENTS

| | | |
|---|---|---|
| 1,853,308 A | 4/1932 | Humphreys et al. |
| 1,852,197 A | 12/1932 | Wilson |
| 1,922,357 A | 6/1933 | Divney et al. |
| 3,689,123 A | 9/1972 | Barbieri |
| 3,841,424 A | 10/1974 | Purcell et al. |
| 3,888,132 A | 6/1975 | Russ, Sr. |
| 3,931,687 A | 1/1976 | Johns, Jr. |
| 3,991,493 A | 11/1976 | Orth |
| 4,055,007 A | 10/1977 | Johnson |
| 4,207,691 A | 6/1980 | Hyler et al. |
| 4,225,186 A | 9/1980 | Stratton |
| 4,448,273 A | 5/1984 | Barbieri |
| 4,553,790 A | 11/1985 | Boggs |
| 4,704,812 A | 11/1987 | Paramore, Jr. |
| 5,005,921 A | 4/1991 | Edwards et al. |
| 5,018,591 A | 5/1991 | Price |
| 5,240,084 A | 8/1993 | Christianson |
| 5,452,949 A | 9/1995 | Kelderman |
| 5,555,944 A | 9/1996 | Kimoto |
| 5,607,210 A | 3/1997 | Brazier |
| 5,794,714 A | 8/1998 | Brown |
| 5,829,848 A | 11/1998 | Kelderman |
| 5,899,543 A | 5/1999 | Lykken et al. |
| 5,946,831 A | 9/1999 | Wilson, Sr. et al. |
| 5,954,148 A | 9/1999 | Okumura et al. |
| 6,000,847 A | 12/1999 | Close et al. |
| 6,032,389 A | 3/2000 | Perry et al. |
| 6,033,044 A | 3/2000 | Brinkrolf |
| 6,062,662 A | 5/2000 | Witt |
| 6,068,353 A | 5/2000 | Juncker et al. |
| 6,074,025 A | 6/2000 | Juncker et al. |
| 6,112,828 A | 9/2000 | Leal |
| 6,318,484 B1 | 11/2001 | Lykken et al. |
| 6,543,862 B1 | 4/2003 | Kahle et al. |
| 6,557,953 B1 | 5/2003 | Kahle et al. |

*Primary Examiner*—Christopher J. Novosad  
(74) *Attorney, Agent, or Firm*—Jansson, Shupe, Munger & Antaramin, Ltd.

(57) ABSTRACT

An earth working scraper for use removing and transporting earth is disclosed. The scraper includes a scraper blade for scraping earth from a ground surface, a receiving area located near the blade for receiving earth scraped from the ground surface by the blade, a rotatable axle for providing transportation of the scraper connected with respect to the blade and receiving area, and a track apparatus connected with respect to the rotatable axle. The track apparatus may include a continuous flexible track having an upper length and a ground-engaging lower length and including an inner surface, an axle wheel mountable to the rotatable axle for rotational movement therewith, the axle wheel engaging the inner surface of the flexible track along the upper length to drive the flexible track in response to rotation of the axle, and a frame for mounting the axle wheel.

15 Claims, 11 Drawing Sheets

EARTH SCRAPER WITH TRACK APPARATUS

FIELD OF THE INVENTION

This invention relates generally to earth working equipment. More specifically, the invention pertains to scraping devices used to level or smooth a ground surface by scraping and/or spreading earth.

BACKGROUND OF THE INVENTION

In the construction industry, the need for manipulating soil and other bases for construction is frequently encountered. This need typically occurs in the construction of buildings, paved roads and parking lots and other improvements. Oftentimes, the soil to be prepared is in a packed condition that is difficult to loosen or level. Therefore, mechanical scrapers of different designs have been developed to scrape, level or otherwise prepare earth for construction.

Such use requires that scrapers remove and transport large amounts of earth. Scrapers are typically wheeled and may be towed or self-propelled. Either type of scraper includes a pan which may be lowered to be brought into contact with the earth or raised to be brought out of contact with the ground. The scraper pan contains a bin or receptacle for the holding of earth. The pan may feature an opening located proximate the ground surface which may be selectively opened and closed with a scraper blade incorporated into the pan near the opening. When the pan is lowered and the opening opened, the blade scrapes earth into the bin of the pan as the scraper is moved along the surface. Other types of scrapers are permanently in the "open" position such that the blade contacts the earth upon lowering.

A common scraper used in road construction is mounted or hitched upon a large grader-type piece of equipment. A second configuration uses either a direct mount or a hitch mount scraper blade behind a towing tractor. Another type of scraper is the self-loading type in which the scraper includes a tractor portion which pulls the rear scraper portion.

Scrapers are typically used to remove earth at a work site and transport the earth over a substantial distance to another site where earth is needed or to a dump site where excess earth can be accepted. Generally, a haul road from the work site to the intended dump site is planned for use by all earth moving vehicles such that the rest of the construction area is minimally disturbed. Because of the tremendous amount of weight carried by loaded earth moving vehicles, the haul road undergoes extreme compression. Frequently, any soft patch of earth is more greatly compressed than any neighboring hard-packed earth. Such differences in compression cause ruts which impact the wheels of the earth moving vehicles during transport. The wheels transfer the impact force to the vehicles and cause the vehicles to experience bounce, in which the weight of the vehicles is transferred up and down as the vehicles move along the haul road.

The bounce of the vehicles, in turn, pumps the road beyond the initial rut and causes further rutting until virtually the entire road is rutted from the work site to the dump site. For instance, an initial rut causes a vehicle to bounce and pump the haul road beyond the rut. Such rutting typically requires earth moving vehicles to travel at lower speeds than is preferred which causes a substantial increase in the amount of time needed to complete an earth moving operation.

This problem may be encountered even when traveling on a smooth roadway without variable initial earth compaction because the vibration inherent in the use of motorized vehicles is often translated into a bouncing motion by the scraper's wheels. When dealing with very heavy equipment and loads, such small vibration quickly leads to a large bouncing force which is able to pump the roadway and cause rutting.

Another problem is frequently encountered by scrapers which are used on hill sides or other uneven terrain. Often scrapers employed in such use slide down the hillside or even roll over during operation. Sliding is typically caused by the heavy load of the scraper coupled with the poorer traction of the scraper's wheels compared to the towing device's wheels or the tractor portion's wheels. Rolling over usually occurs when the uphill wheel of the scraper encounters a bump or rut which causes the uphill tire to bounce. The upward shift in weight causes the center of gravity to shift upward and results in the scraper rolling over, especially when the scraper is holding a large amount of weight.

Another problem faced by scrapers is the uniform compaction of earth under the scraper wheels in the direction of travel. Use of scrapers along a path often results in grooves in which the scraper's wheels ride. Eventually such grooves become so deep that the underside of the scraper hits the earth between the grooves and the scraper becomes stuck. This problem is aggravated when working in wet areas where a loaded scraper may sink into the earth on its first pass across a path. Often a fully loaded scraper must be unloaded before it can be removed from its stuck position, resulting in a large delay in completing the job. Therefore, the resistance to sinking into soil, or flotation, would be highly desirable for a scraper.

As can be seen, regardless of the type of scraper utilized, several problems are encountered when removing and transporting large amounts of earth. Therefore, in view of these problems and their consequences, there is a need in the field of earth scraping for an improved scraper.

OBJECTS OF THE INVENTION

It is an object of the invention to provide an improved scraper for removing and transporting earth.

Another object of the invention is to provide a scraper which eliminates or reduces vibration and/or bouncing during transport.

Another object of the invention is to provide a scraper which allows transport at higher speeds over smooth or uneven terrain.

Another object of the invention is to provide a scraper which does not cause rutting on smooth or uneven roads.

Another object of the invention is to provide a scraper which provides for reduced stress on scraper components.

Another object of the invention is to provide a scraper which reduces the power requirement to pull in adverse conditions.

Another object of the invention is to provide a scraper which has a lower center of gravity than traditional scrapers.

Another object of the invention is to provide a scraper which more ably negotiates hillsides than traditional scrapers.

Another object of the invention is to provide a scraper which has reduced compaction of the earth compared to traditional scrapers.

Another object of the invention is to provide a scraper with increased traction.

Another object of the invention is to provide a scraper with a track apparatus which provides increased performance.

Another object of the invention is to provide a scraper with a track apparatus having a uni-body frame.

Another object of the invention is to provide a scraper with a track apparatus having wheels engaging a track which provide for use with a large axle wheel.

Still another object of the invention is to provide a scraper with a track apparatus with a tensioning device for maintaining tension of the continuous track.

These and other objects of the invention will be apparent from the following descriptions and from the drawings.

BRIEF SUMMARY OF THE INVENTION

In accordance with the present invention, an improved scraper for earth removal and transport is provided. The scraper of this invention overcomes certain problems and shortcomings of the prior art, including those noted above, and provides a unique structure satisfying a number of specific needs.

In certain embodiments, the earth working scraper comprises a scraper blade for scraping earth from a ground surface, a receiving area located near the blade for receiving earth scraped from the ground surface by the blade, a rotatable axle connected with respect to the blade and receiving area for providing movement of the scraper to allow the blade to scrape the earth, and a track apparatus connected with respect to the rotatable axle. Such a track apparatus may comprise a continuous flexible track having an upper length and a ground-engaging lower length, an axle wheel mountable to the rotatable axle for rotational movement therewith, and a frame for mounting the axle wheel. The axle wheel may engage the inner surface of the flexible track along only a middle portion of the upper length to drive the flexible track in response to rotation of the axle The scraper may further comprise a first end adapted for attachment to a prime mover and a second end including the rotatable axle. There may be two track apparatus axially aligned on either side of the second end such that the second end is solely supported by track apparatus.

In certain embodiments, the scraper is a pull-type scraper such that it is towed by the prime mover and the rotatable axle of the scraper need not be powered. In such embodiments, the scraper is connected to the prime mover by a hitch. In other embodiments the rotatable axle is powered such that the axle wheel acts as a wheel and powers rotational movement of the track and, thus, movement of the scraper. In still other embodiments, the scraper may include a hitch for connection to a towing vehicle and include a powered rotatable axle providing rotational movement of the track The receiving area may be an interior bin which is located adjacent to the scraper blade to receive earth from the scraper blade. Such a bin may have an open top and/or sides, or it may be enclosed to some degree, even substantially enclosed.

The scraper may also be of the self-loading pan type in which the scraper comprises a tractor section and a scraper section; the scraper section including the blade, receiving area, axle and track apparatus, and the tractor section including a pair of ground-engaging wheels. Movement of such a scraper may rely on the ground-engaging wheels of the tractor section when the ground-engaging wheels are powered, or the rotatable axle and track apparatus of the scraper section may be powered, or both sections may be powered.

In certain embodiments, the ground-engaging wheels are converted into track apparatus as well. To improve traction, the flexible tracks on the track apparatus of the scraper section may be installed backwards, particularly in pull-type applications.

In some embodiments, multiple scrapers are utilized such that the first end of a first scraper is adapted for attachment to a second scraper with the second end of the first scraper including the rotatable axle and track apparatus. In such embodiments, the second scraper may be independently powered, towed by a prime mover, or both powered and towed, and the first scraper may be independently powered, towed by the second scraper, or both powered and towed. For certain applications a large number of scrapers may be connected for towing.

The track apparatus may include a plurality of wheels which engage the inner surface of the track, including leading and trailing idler wheels and at least one bogie wheel which engages only a middle portion of the lower length of the track.

The frame may be of a uni-body construction such that it includes fixed-mounts in fixed relative positions. The frame of the track apparatus may define a lateral recess receiving the axle wheel. The frame may include a spindle hub for rotatably receiving an axle of a vehicle therein.

The axle wheel may be mounted to one of the fixed-mounts and turn on the fixed-mount axis defined by the respective fixed-mount. One of the idler wheels may be rotatably mounted to one of the fixed-mounts and turn on the respective fixed-mount axis. At least one bogie wheel may be rotatably mounted to one of the fixed-mounts and turn on the respective fixed-mount axis. An idler-mounting bracket may be pivotably mounted to another of the fixed-mounts and may pivot on the respective fixed-mount axis. Such bracket may have an idler-mount defining an idler-mount axis at which the other idler wheel may be rotatably mounted in variable positions with respect to the frame.

The fixed-mounts may comprise apertures for receiving axles therethrough. The trailing idler wheel may be rotatably mounted to one of the fixed-mounts and the leading wheel may be rotatably mounted to the idler-mount. The trailing idler wheel may comprise a pair of axially-aligned wheels and the leading idler wheel may comprise a pair of axially-aligned wheels.

A leading idler assembly including the leading idler wheel which engages the flexible track may be attached to the frame at one of the fixed mounts. Likewise, a trailing idler assembly including the trailing idler wheel which engages the flexible track may be attached to the frame at one of the fixed mounts.

The track apparatus may comprise an idler assembly having an idler wheel engaging the track and being moveable with respect to the frame and a tensioning device for maintaining tension on the continuous flexible track. The tensioning device may comprise a main-cylinder housing, a main piston, and primary and secondary dampening structures which may be mounted at a position remote from the housing and piston. The main-cylinder housing may be interconnected to one of the frame and the idler assembly, extend along an axis, and define a main chamber therein. The main piston may have a first end operatively connected to the other of the frame and the idler assembly and a second end slidably received within the chamber such that the piston is movable between a retracted position and an extended position. The primary dampening structure may resist movement of the piston toward the retracted position for a first predetermined axial length and the a secondary dampening structure may resist movement of the piston toward the retracted position for a further axial length beyond the first predetermined axial length independent of the primary dampening structure.

The primary dampening structure may include a primary cylinder extending along an axis and defining a primary chamber therein, and a primary piston slidably received in the primary cylinder and movable axially between a first and second position, the primary piston dividing the primary chamber into a first portion for receiving a pressurized gas and a second portion. The secondary dampening structure may include a secondary cylinder extending along an axis and defining a secondary chamber therein, and a secondary piston slidably received in the secondary cylinder and movable axially between a first and second position, the secondary piston dividing the secondary chamber into a first portion for receiving a pressurized gas and a second portion. A conduit may interconnect the main chamber and the second portion of the secondary chamber and hydraulic fluid may be disposed within the second portion of the secondary chamber.

The pressure of the pressurized gas in the first portion of the secondary chamber may be greater than the pressure of the pressurized gas in the first portion of the primary chamber and the primary and secondary dampening structures may operate to progressively increase resistance to movement of the idler wheel toward the deflected position as the idler wheel moves toward the deflected position.

The flexible track may include spaced lugs projecting from its inner surface with each lug terminating in a distal surface spaced inwardly from the main inner surface. The axle wheel may comprise a central hub portion mountable on the axle for rotational movement therewith, a radially-extending portion terminating in a circumferential edge, and a peripheral portion affixed to the circumferential edge and having outwardly-facing lug-engagement surfaces positioned for engagement with the distal surfaces of the track lugs.

The peripheral portion may include an outer rim forming the outwardly-facing lug-engaging surfaces and the outer rim may include a plurality of spaced openings therein. The peripheral portion may include peripherally-spaced cross-members affixed to the circumferential edge and forming the outwardly-facing lug-engaging surfaces.

The peripheral portion affixed to the circumferential edge may have radially-projecting drive members defining lug-receiving gaps therebetween in which the outwardly-facing lug-engagement surfaces are positioned for engagement with the distal surfaces of the track lugs. The peripheral portion may include a plurality of spaced openings for allowing debris to pass through the peripheral portion.

The outwardly-facing lug-engagement surfaces may be substantially planar. The outwardly-facing lug-engagement surfaces may instead be substantially convex. Each lug-engagement surface may extend in an axial direction parallel to the drive axis such that each lug-engagement surface is a portion of a cylinder.

The axle wheel may be substantially free of side structure in positions laterally adjacent to the lug-engagement surfaces and radially beyond the circumferential edge such that the track lugs are free to adjust their precise positions of engagement with the lug-engagement surfaces.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment. In the drawings.

DETAILED DESCRIPTION OF PREFERRED EMBODIMENTS

Prior track apparatus for vehicles are disclosed in U.S. Pat. Nos. Re36,284 (Kelderman), U.S. Pat. No. 5,829,848 (Kelderman), U.S. Pat. No. 6,536,854 (Kahle et al.), 6,543,861 (Kahle et al.), U.S. Pat. No. 6,543,862 (Kahle et al.) and U.S. Pat. No. 6,557,953 (Kahle et al.) assigned to the assignee of the present invention and incorporated herein by reference.

Figure 1:
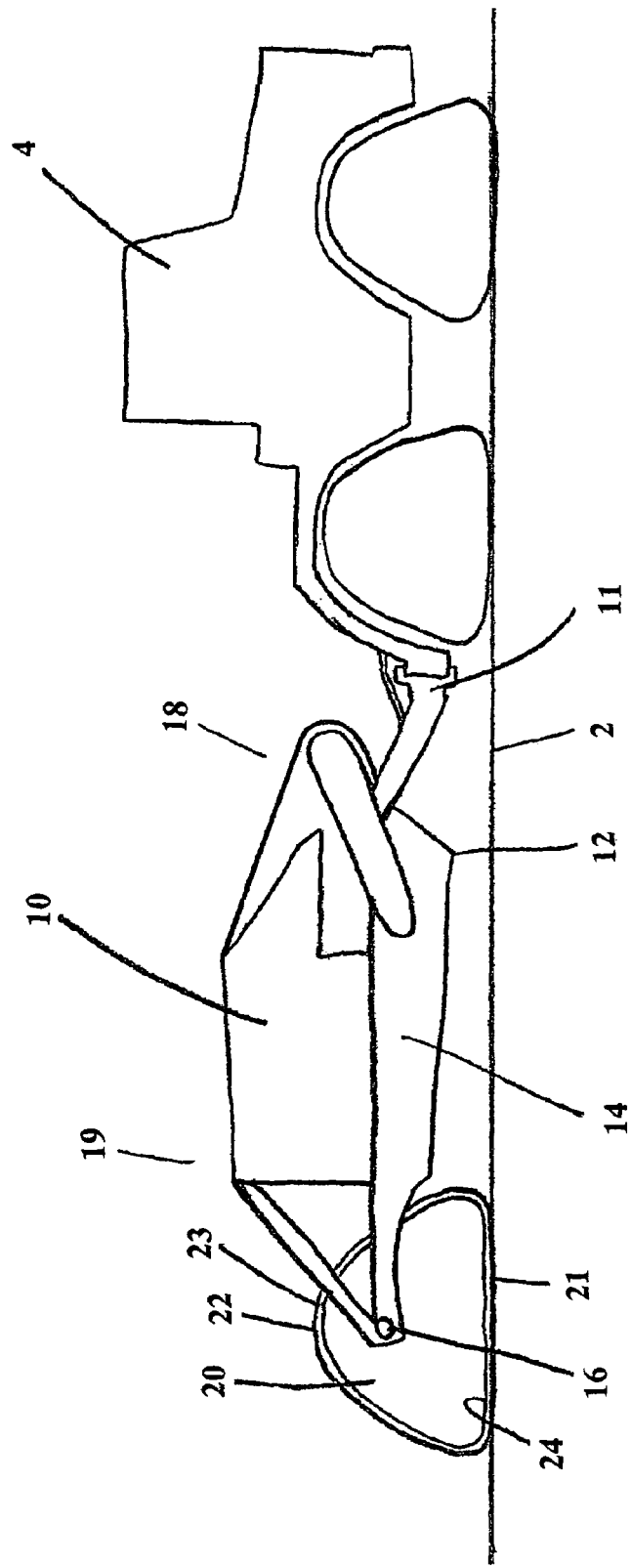
FIG. 1 is a side elevational view of a pull-type scraper shown towed by a tractor in accordance with the invention.

Referring to FIG. 1, a scraper in accordance with the present invention is generally designated by the reference numeral 10. Scraper 10 includes a blade 12, receiving area or bin 14, rotatable axle 16 and track apparatus 20. Track apparatus 20 includes flexible track 22 which has an upper length 23 and lower length 21 for engaging the ground. Flexible track 22 includes an inner surface 24. As shown rotatable axle 16 and track apparatus 20 are positioned at the second end 19 of scraper 10 while a hitch 11 is positioned at first end 18. Hitch 11 provides for connection to a towing vehicle such as tractor or prime mover 4. A hydraulic connection provides power from tractor 4 to scraper 10 to allow lowering and raising of scraper blade 12. As with typical scrapers, blade 12 is lowered to a depth and scraper 10 is towed forward such that blade 12 scrapes ground surface 2 thereby removing earth. The earth is forced into receiving area or bin 14 until full, then blade 12 is raised and scraper 10 is towed to a dump site before the earth is released from bin 14. Rotatable axle 16 may be powered such that track apparatus 20 provides movement to scraper 10.

Track 22 provides for substantially more contact with the ground surface. For instance, for a thirty inch track, track 22 has three and a half times more contact with the ground than a conventional track. Likewise, for a thirty-six inch track, track 22 has nine to ten times more contact with the ground that a conventional track.

Track apparatus 20 provides for reduced vibration and/or bouncing of scraper 10. Since vibration of scrapers typically requires scraper components such as the hitch and draw bar to be torqued monthly, the reduction of vibration lessens the need for maintenance and lengthens the working life of scraper components.

Scrapers are preferably towed at 20 mph when transporting earth and are preferably towed at about 4 mph when scraping earth. Scraper 10 can be towed at 20 mph despite uneven terrain, ruts or other factors which require typical scrapers to be towed at slower speeds. Furthermore, scraper 10 has a lower center of gravity than typical scrapers which facilitates use of scraper 10 on hillsides or other difficult terrain without rolling or tipping over.

Figure 2:
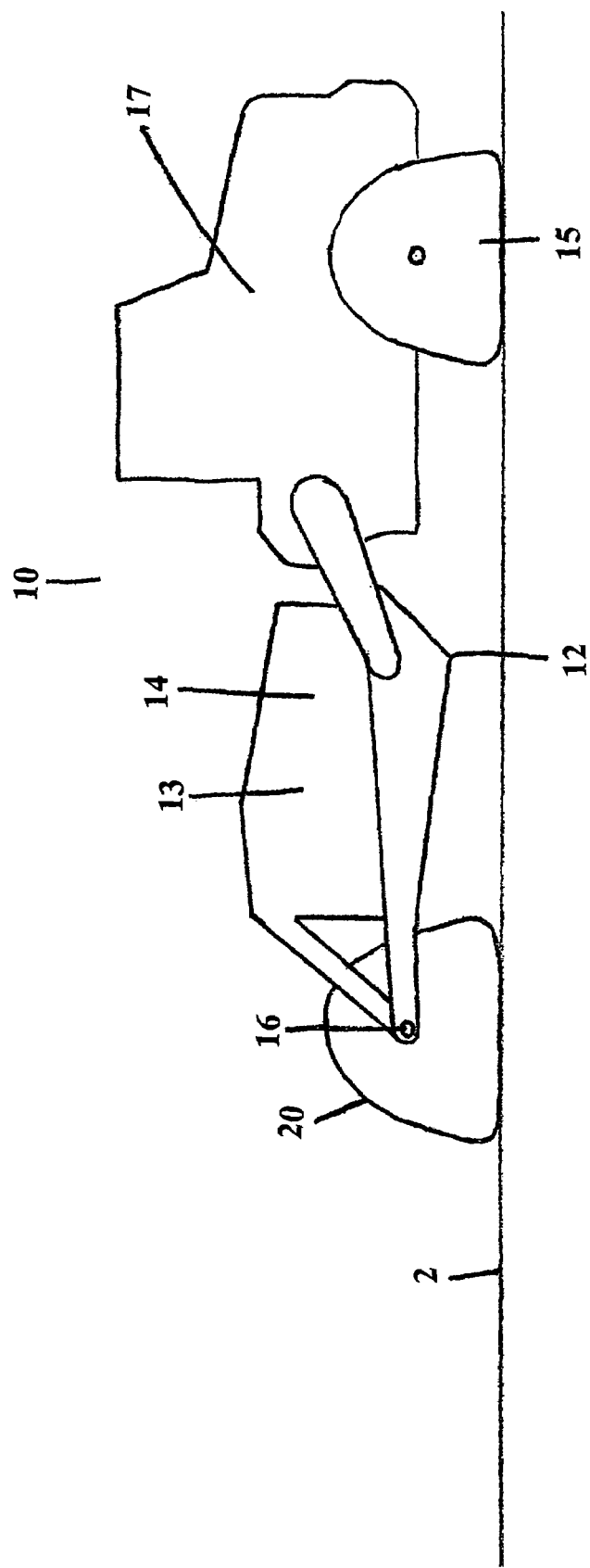
FIG. 2 is a side elevational view of a self-loading type scraper in accordance with the invention.

FIG. 2 depicts a self-loading type of scraper 10 in which scraper 10 includes a tractor portion 17 and a scraper portion 13. Towing portion 17 includes ground-engaging wheels 15, which are shown converted to track apparatus 20. Scraper portion 13 includes scraper blade 12 which may be lowered into contact with ground surface 2 and raised out of contact, receiving area or bin 14, rotatable axle 16 and track apparatus 20.

Figure 3:
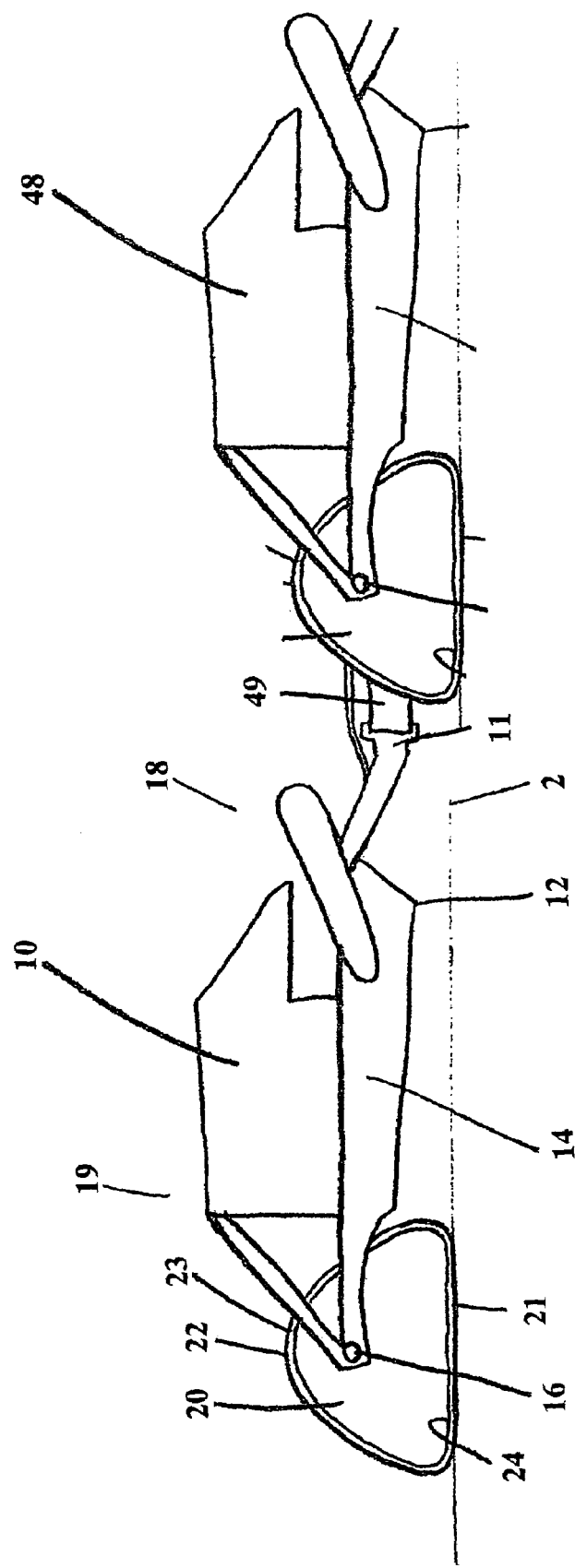
FIG. 3 is a side elevational view of a pull-type scraper being towed by another scraper in accordance with the invention.

FIG. 3 shows a pull-type scraper 10 connected for towing by a second scraper 48. Second scraper 48 includes a towing hitch 49 to which hitch 11 of scraper 10 is connected. As can be understood, several scrapers 10 can be further connected to one another. Such an arrangement provides for efficient scraping of a ground surface 2 with minimal passes over a pathway.

Figure 4:
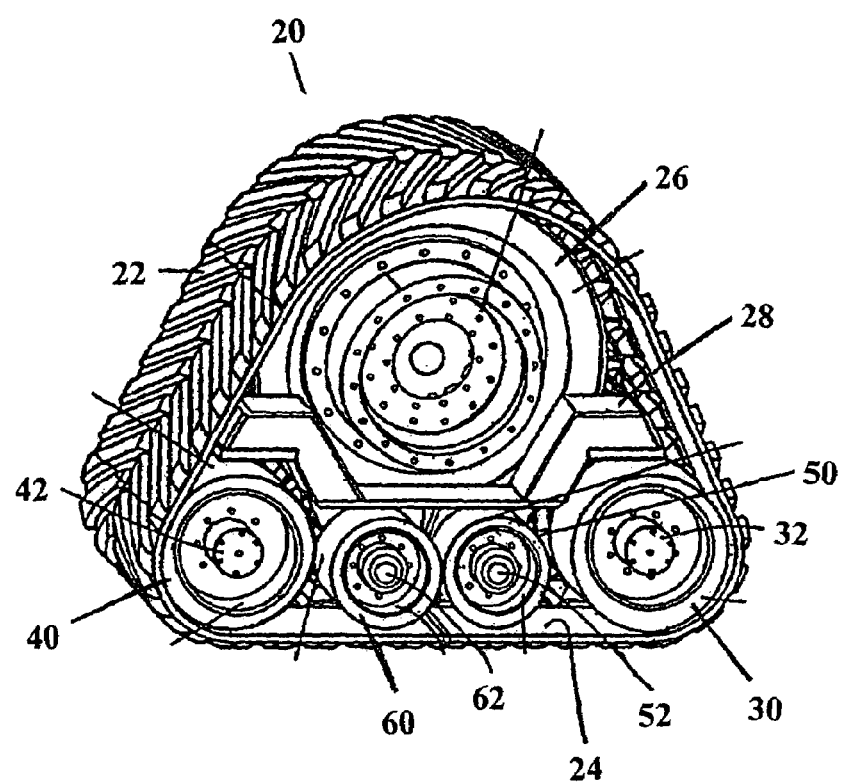
FIG. 4 is an interior isometric view of a track apparatus in accordance with the invention.

FIG. 4 shows flexible track 22 around track apparatus 20. As shown, track apparatus 20 includes frame 28 mounted about axle wheel 26. Axle wheel 26 is mountable to the rotatable axle 16 of scraper 10 for rotational movement therewith in order to drive or be driven by flexible track 22. Also shown are leading idler wheel 30 mounted on leading idler axle 32, trailing idler wheel 40 mounted on trailing idler axle 42, leading bogie wheel 50 mounted on leading bogie axle 52 and trailing bogie wheel 60 mounted on trailing bogie axle 62.

Figure 5:
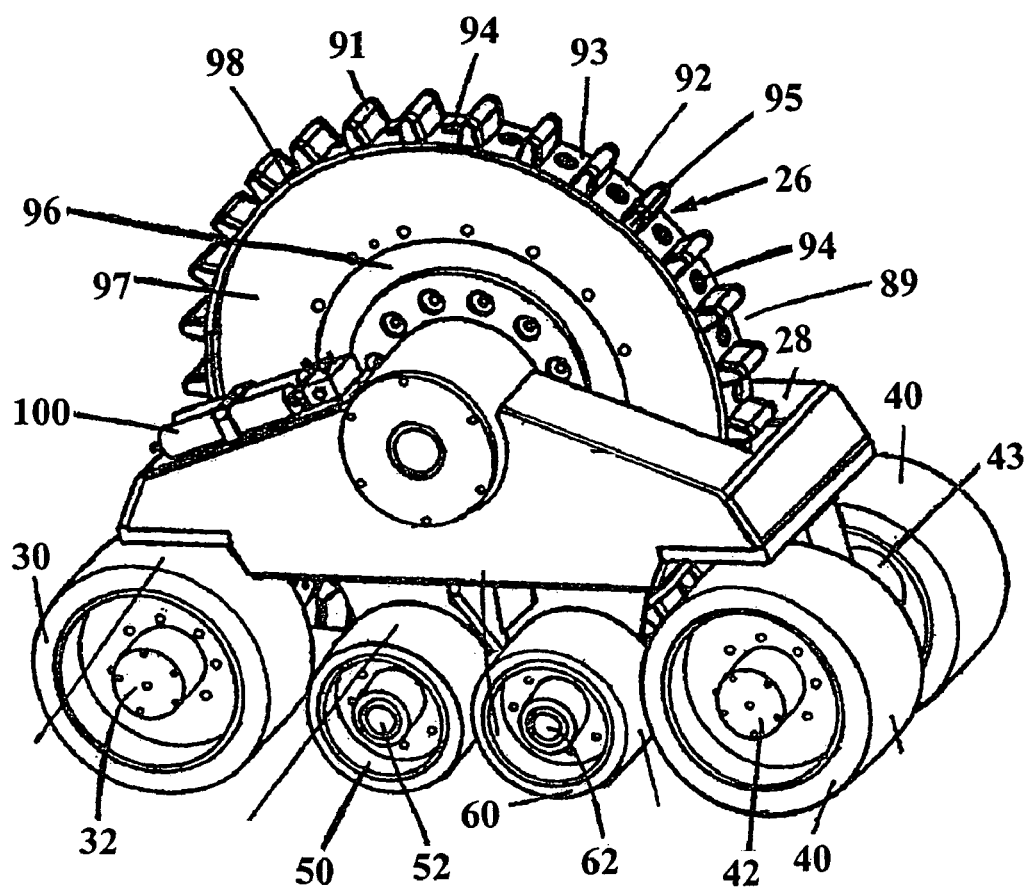
FIG. 5 is an exterior isometric view of a frame and plurality of wheels of a track apparatus in accordance with the invention.

FIG. 5 is the reverse view of FIG. 4 with track 22 removed. As shown, axle wheel 26 includes a central hub portion 96 which is mountable on rotatable axle 16 for rotation therewith. Wheel 26 further includes a radially-extending portion 97 having inner and outer surfaces. Radially-extending portion 97 of wheel 26 terminates in a circumferential edge 98 where a peripheral portion 95 of wheel 26 is affixed thereto. Peripheral portion 95 may include an outer rim 92 which is affixed (welded) to circumferential edge 98.

Outer rim 92 of wheel 26 includes a plurality of circumferentially spaced openings 94 therein for allowing accumulated debris to pass therethrough. Outer rim 92 includes an outer surface 93 having a plurality of circumferentially spaced drive members 91 projecting radially therefrom and defining lug-receiving gaps 89. As hereinafter described, radially-projecting drive members 91 are intended to engage corresponding track lugs 90 which project inwardly from the main inner surface 24 of flexible track 22 in order to drive or be driven by flexible track 22.

In operation, track apparatus 20 is mounted to rotatable axle 16. Axle 16 may be rotated in a conventional manner through scraper 10, if it is powered, by an engine and through a transmission which can vary the speeds and allow for forward and reverse rotation. Flexible track 22 of track apparatus 20 is positioned over wheel 26 such that track lugs 90 projecting from the inner surface 24 of flexible track 22 are received between corresponding pairs of drive members 91 projecting from outer surface 93 of outer rim 92 of wheel 26. As wheel 26 rotates, drive members 91 engage corresponding track lugs 90 and drive flexible track 22 about wheel 26. Thereafter, successive drive members 91 engage subsequent track lugs 90 extending from main inner surface 24 of flexible track 22 so as to drive flexible track 22 about wheel 26.

As shown, track apparatus 20 includes a plurality of wheels including axle wheel 26, leading idler wheel 30, trailing idler wheel 40, leading bogie wheel 50 and trailing bogie wheel 60. Trailing idler wheel 40 is shown comprising a pair of axially aligned wheels separated to form a void 43 into which wheel 26 extends; however, leading idler wheel 30 and leading and trailing bogie wheels 50,60 also comprise pairs of axially aligned wheels which define voids into which wheel 26 may extend. Wheel 26 may intersect the axis defined by each pair of wheels 30,40,50,60.

Also shown is dampening mechanism 100 positioned remote from the housing and piston of the tensioning device as discussed below.

Figure 6:
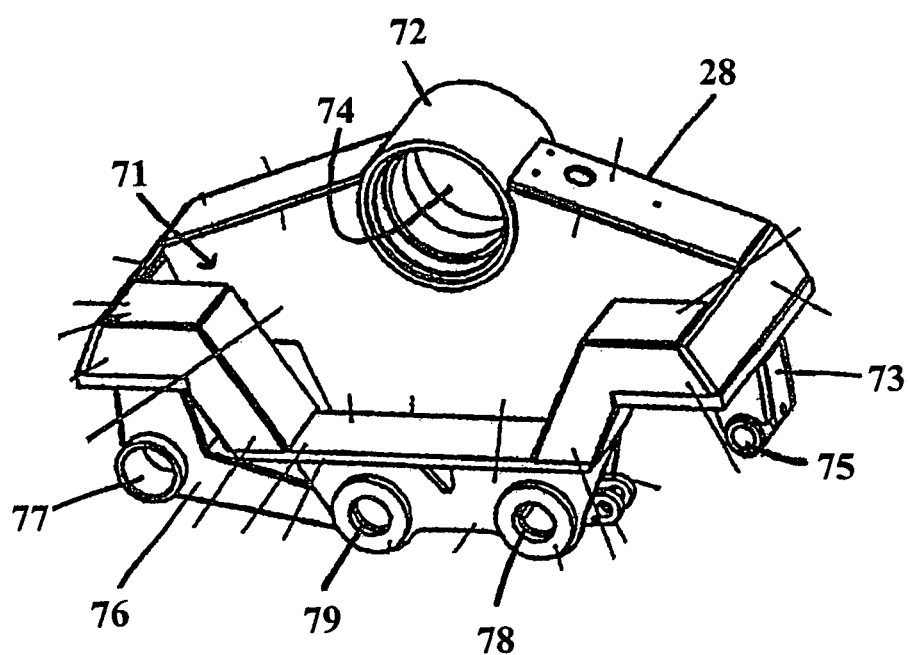
FIG. 6 is an interior isometric view of a frame of a track apparatus in accordance with the invention.

FIG. 6 shows the uni-body construction of frame 28. Frame 28 includes first and second side portions which define a wheel receipt well 71 therebetween for receiving wheel 26. The side portions of frame 28 are interconnected by front and rear end panels. Spindle hub 72 forms spindle hub aperture 74 which is one of several fixed-mounts on frame 28. The side panels include leading and trailing intermediate apertures 78,79, respectively, therethrough for receiving corresponding leading and trailing bogey axles 52,62, respectively, as hereinafter described. Reinforcement elements may be mounted on the outer surface of the side panel about corresponding apertures 78,79, respectively, to reinforce apertures 78,79 and prevent deformation of the same by the bogey axles received therein. Apertures 78,79 are fixed-mounts used for mounting bogey wheels 50,60.

Frame 28 includes leading idler arm 73 and trailing idler arm 76. Leading idler arm 73 includes leading idler arm aperture 75 which is a fixed mount. Trailing idler arm 76 includes trailing idler aperture 77 which is a fixed mount.

Figure 7:
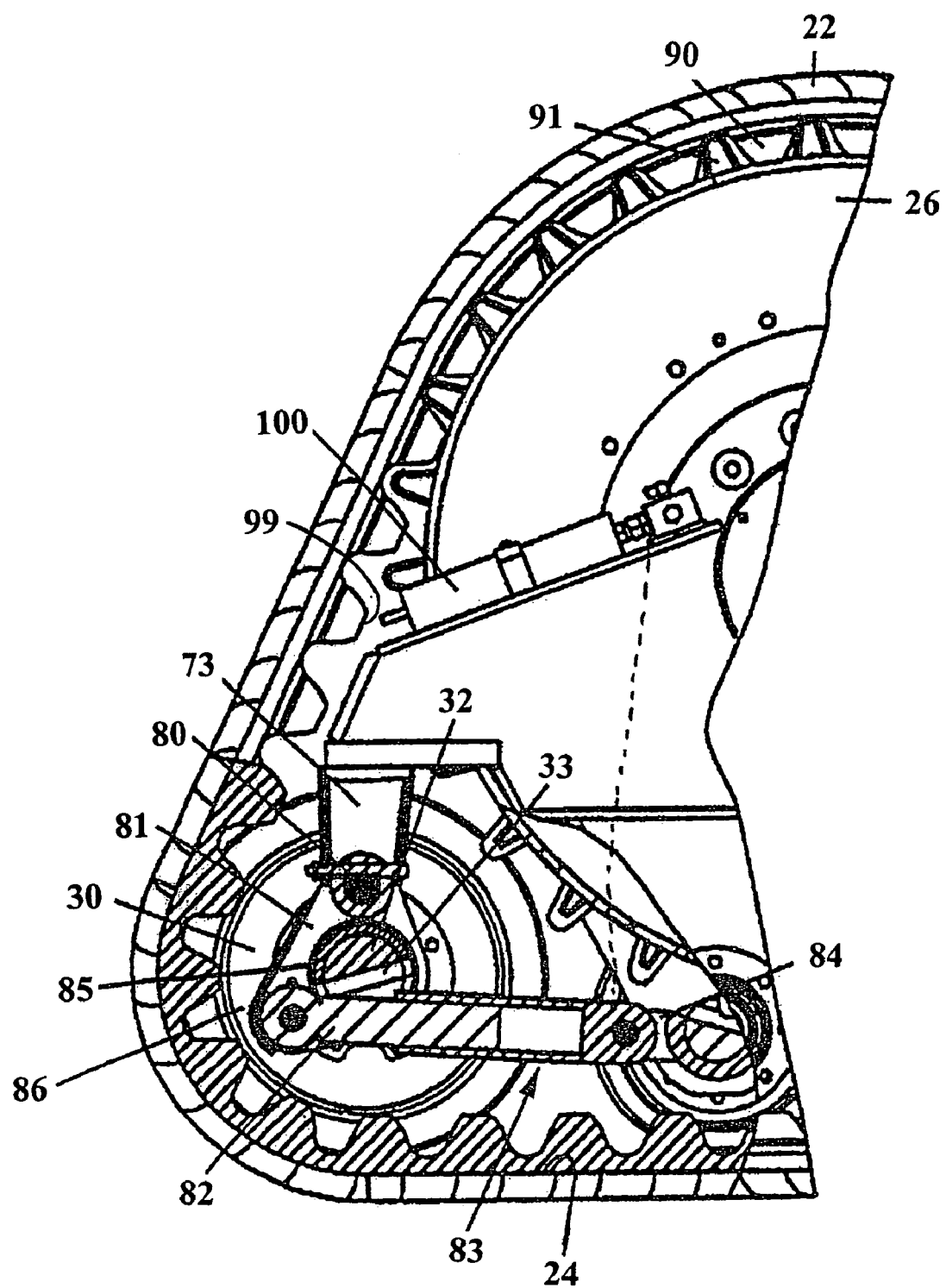
FIG. 7 is an exterior elevational view, partially in section, of a track apparatus showing the leading idler bracket and tensioning device in accordance with the invention.

FIG. 7 shows more clearly the engagement between lugs 90 and drive members 91. As shown leading idler aperture 75 of leading idler arm 73 receives a pin 80 which is utilized to connect leading idler assembly 86 including leading idler support bracket 81 thereto. Thus, leading idler-mounting bracket 81 is pivotally mounted to leading idler support arm 73 by pivot pin 80 extending through aperture 75. Bracket 81 includes idler mount 85 for mounting leading idler wheel 30 by receiving leading idler axle 32. Leading idler axle 32 includes a notch 33 formed therein for allowing piston shaft 82 of cylinder 83 to extend therepast. As is conventional, leading idler axle 32 supports leading idler wheels 30 on opposite ends thereof.

Flexible track 22 of track apparatus 20 is positioned over wheel 26 such that track lugs 90 projecting from the inner surface 24 of flexible track 22 are received between corresponding pairs of drive members 91 projecting from outer surface 93 of outer rim 92 of wheel 26. As wheel 26 rotates drive members 91 successively engage corresponding track lugs 90 and drive flexible track 22 about wheel 26.

Flexible track 22 extends from wheel 26 around leading idler wheels 30, leading and trailing bogey wheels 50,60 and trailing idle wheels 40. As is apparent, flexible track 22 is in the form of a continuous loop. The aforementioned tensioning apparatus 100 serves to adjust the position of leading idler wheels 30 relative to leading aperture or fixed-mount 75, thereby allowing tension adjustment and leading idler wheel deflection in response to obstructions and other surface irregularities encountered by the scraper.

All other wheels on which track 22 is mounted, including wheel 26, trailing idler wheels 40, and leading and trailing bogey wheels 50,60, are mounted in reliably fixed positions relative to one another, on the aforementioned "fixed-mounts" of uni-body frame 28. The track apparatus frame of the invention avoids or minimizes frame distortion, and the problems related thereto.

Figure 8:
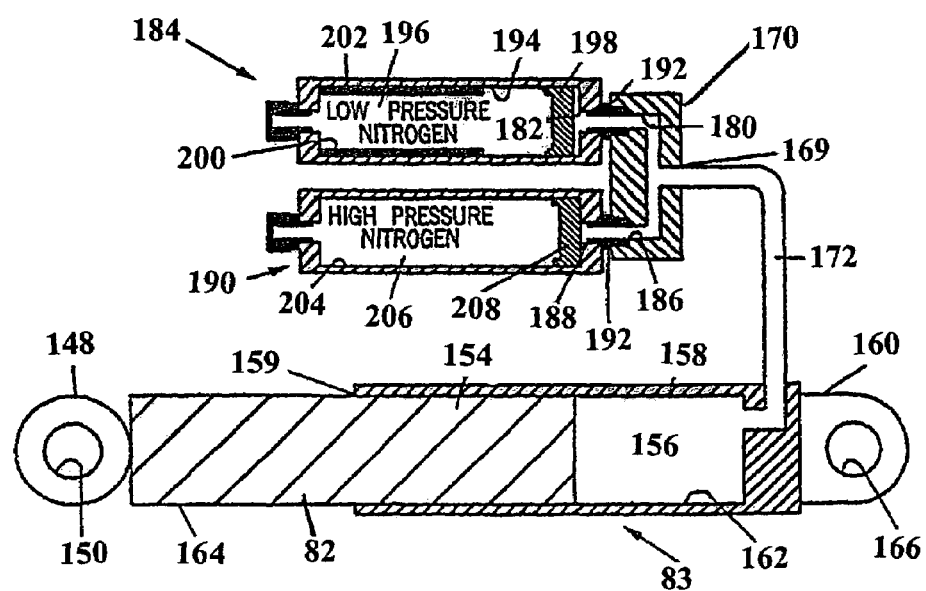
FIG. 8 is a schematic view of the tensioning device including the dampening system in accordance with the invention.

FIG. 8 details the operation of tensioning device 100. As shown, main piston shaft 82 includes a second opposite end 154 received within chamber 156 within cylinder housing 158 of cylinder 83. Cylinder housing 158 includes a first open end 159 for allowing piston shaft 82 to be inserted within main-cylinder chamber 156 and an opposite closed end 160. Inner surface 162 of cylinder housing 158 forms a slidable interface with the outer surface 164 of piston shaft 82. Closed end 160 of cylinder housing 158 includes a dog ear having an opening 166 passing therethrough. Closed end 160 of cylinder housing 158 is positioned between mounting flanges 84 such that opening 166 in closed end 160 is aligned with the openings in mounting flanges 84. Pin 80 extends through the openings in mounting flanges 84 and through opening 166 in closed end 160 of cylinder housing 158 so as to pivotally connect cylinder 83 to frame 28.

Chamber 156 within cylindrical housing 158 communicates with input 169 of manifold 170 through conduit 172. In a preferred embodiment, manifold 170 is mounted to upper surface of the upper panel of frame 28. Manifold 170 includes a first output 180 operatively connected to the input 182 of low pressure cylinder 184 and a second output 186 operatively connected to the input 188 of high pressure cylinder 190. Seals 192 are provided between the outputs 180 and 186 of manifold 170 and the inputs 182 and 188 of cylinders 184 and 190, respectively, to maintain the integrity of the connections therebetween.

Primary-dampening cylinder 184 includes an inner surface 194 defining a primary-dampening chamber 196 therein. A primary-dampening piston 198 is slidably received within chamber 196 so as to divide chamber 196 into a first portion for receiving low pressure nitrogen gas therein and a second portion which communicates with chamber 156 within cylinder housing 158 through manifold 170 and conduit 172. A generally tubular limiter member 200 is positioned within chamber 196. Limiter member 200 includes an outer surface 202 which engages the inner surface 194 of cylinder 184. Limiter member 200 limits movement of piston 198 such that piston 198 is slidable between a first position and a second position.

Secondary-dampening cylinder 190 includes an inner surface 204 defining a secondary-dampening chamber 206 therein. A secondary-dampening piston 208 is slidably received within chamber 206 so as to divide chamber 206 into a first portion for receiving a high pressure nitrogen gas therein and a second portion which communicates with chamber 156 within cylinder housing 158 through manifold 170 and conduit 172. It is contemplated to provide a fluid within chamber 156 of cylinder housing 158, conduit 172, manifold 170, and second portions 196*b* and 206*b* of chambers 196 and 206, respectively, in cylinders 184 and 190, respectively.

As main piston shaft 82 moves into main-cylinder chamber 156 of cylinder housing 158 fluid is urged from chamber 156 through conduit 172 into manifold 170. Given that the first portion of primary-dampening chamber 196 of cylinder 184 is filled with a low pressure nitrogen gas and that the first portion of secondary-dampening chamber 206 of cylinder 190 is filled with a high pressure nitrogen gas, the fluid within manifold 170 will take the path of least resistance and urge piston 198 within chamber 196 against the bias of the low-pressure nitrogen gas in first portion of chamber 196 in cylinder 184. Travel of piston 198 within chamber 196 is terminated when piston 198 engages limiter member 200, which corresponds to a predetermined distance X which piston shaft 82 is inserted into chamber 156 of cylinder housing 158. Thereafter, as piston shaft 82 is further inserted into chamber 156 of cylinder housing 158, the fluid within manifold 170 will attempt to urge piston 208 against the force of the high pressure nitrogen gas present in first portion 206*a* of chamber 206 of second cylinder 190.

The amount of force necessary to insert main piston shaft 82 a predetermined distance within chamber 156 of cylinder housing 158 gradually increases from an initial value A to an increased value A' as the low pressure nitrogen gas is compressed in first portion 196*a* of primary-dampening chamber 196 in cylinder 184 by piston 198 being urged from the first to the second position by the fluid. Thereafter, the amount of force necessary to further insert piston shaft 82 a second predetermined distance Y-X within secondary-dampening chamber 156 of cylinder housing 158 gradually increases from an initial value B to an increased value B'. Since the nitrogen gas within secondary-dampening cylinder 190 is under greater pressure than the nitrogen gas within primary-dampening cylinder 184, a substantially greater force is required for piston shaft 82 to travel the predetermined distance Y-X than the initial predetermined distance X.

Figure 9:
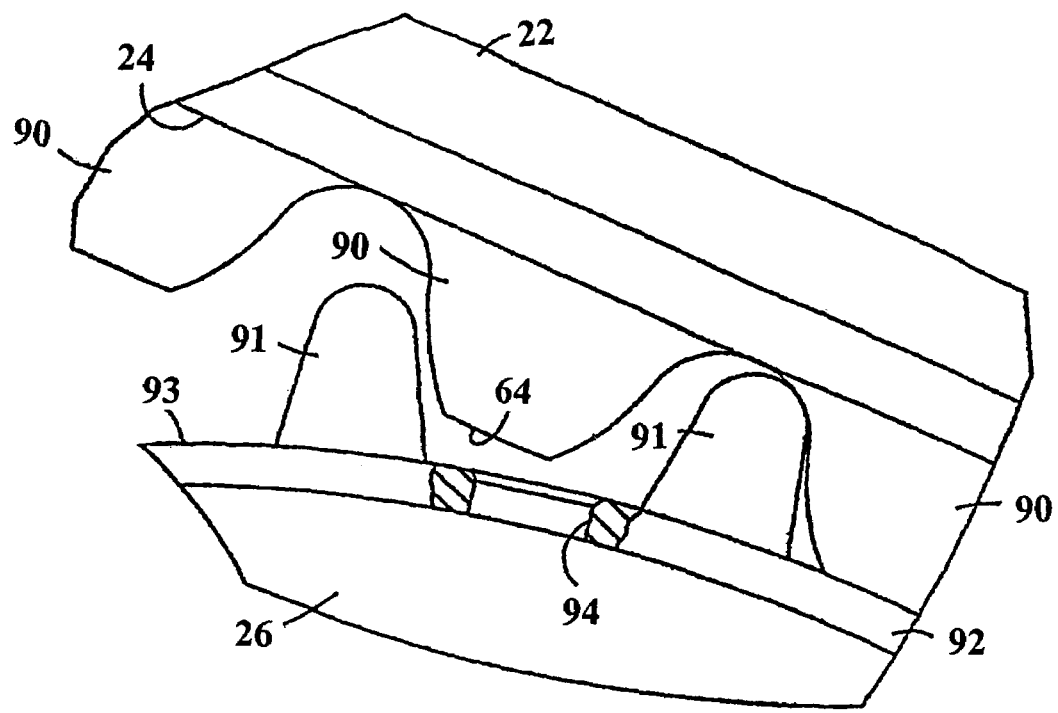
FIG. 9 is a side elevational view, partially-in-section, of a portion of the track apparatus of FIG. 7 showing engagement of the flexible track with the axle wheel in accordance with the invention.
Figure 10:
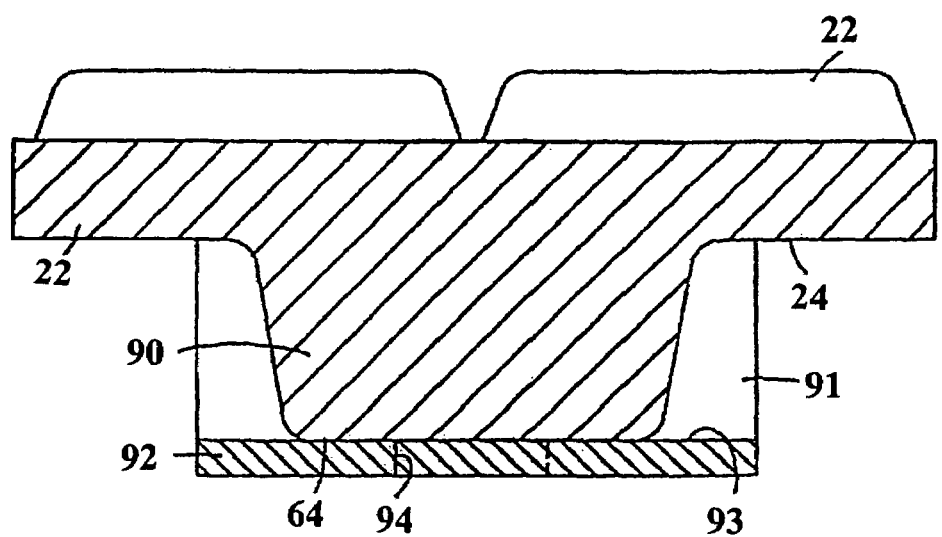
FIG. 10 is a cross sectional view, partially-in-section, of a portion of the track apparatus of FIG. 7 showing engagement of the flexible track with the axle wheel in accordance with the invention.

FIGS. 9 and 10 show that distal end surfaces 64 of track lugs 90 engage outer surface 29 of outer rim 92 of wheel in order that track lugs 90 are supported when driven by wheel 26. Such full engagement is seen in FIG. 10 and in the rightmost position of FIG. 9. Such full engagement, by which track 22 tends to function more like a driven belt and less like a driven chain, tends to minimize shearing forces on track lugs 90 and the possible twisting and turning of track lugs 90; hence, damage to track lugs 90 during operation of track apparatus 10 is significantly reduced, extending belt life.

Wheel 26 is free of side structure in positions which are both laterally adjacent to the lug-engagement surfaces that are between adjacent pairs of drive members 91 and radially beyond circumferential edge 98 of radially-extending portion 97 of wheel 26. As noted above, this tends to minimize or substantially eliminate the harmful torsional forces discussed above.

The following is a brief description of the engagement of flexible track 22 with other components of track apparatus 20: As flexible track 22 approaches leading idler wheels 30, track lugs 90 pass therebetween. In addition, the radially outer surfaces of leading idler wheels 30 engage the inner surface 24 of flexible track 22 and direct the lower length 21 of flexible track 22 into contact with a supporting surface such as a ground surface. As flexible track 33 continues to travel about wheel 26, track lugs 90 pass between the pairs of leading and trailing bogie wheels 50,60. The radially outer surfaces of bogie wheels 50,60 engage the inner surface 24 of flexible track 22 along its lower length 21 and insure contact of flexible track 22 with the ground surface along the lower length 21 of flexible track 22. Similarly, as flexible track 22 approaches trailing idler wheels 40, track lugs 90 on the inner surface 24 of flexible track 22 pass therebetween. The radially outer surfaces of idler wheels 40 engage the inner surface 24 of flexible track 22 and guide flexible track 22 onto wheel 26 to form a continuous loop. If wheel 26 is rotated in the opposite direction, trailing idler wheels 40 may function as leading idler wheels and leading idler wheels 30 may function as trailing idler wheels, all as known in the art.

Figure 11:
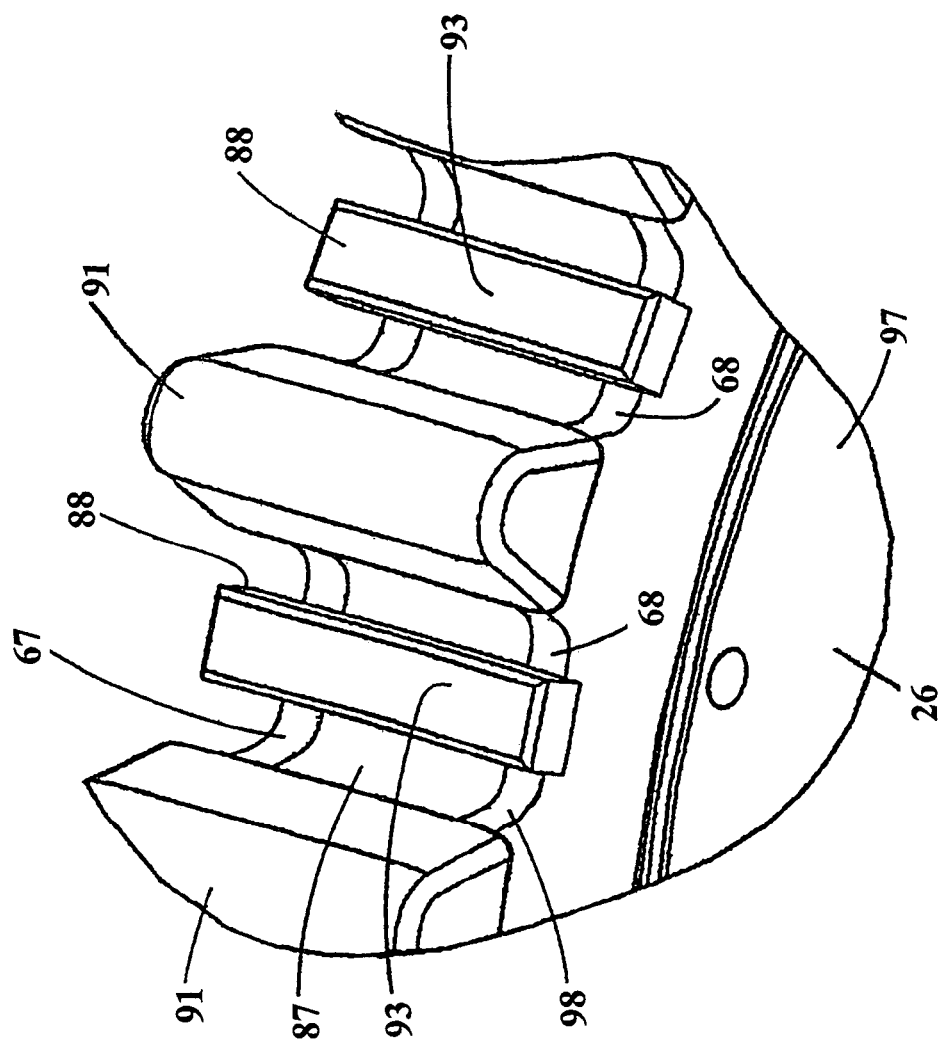
FIG. 11 is a fragmentary perspective view of the axle wheel of the track apparatus showing details of the peripheral portion of the wheel in accordance with the invention.
Figure 12:
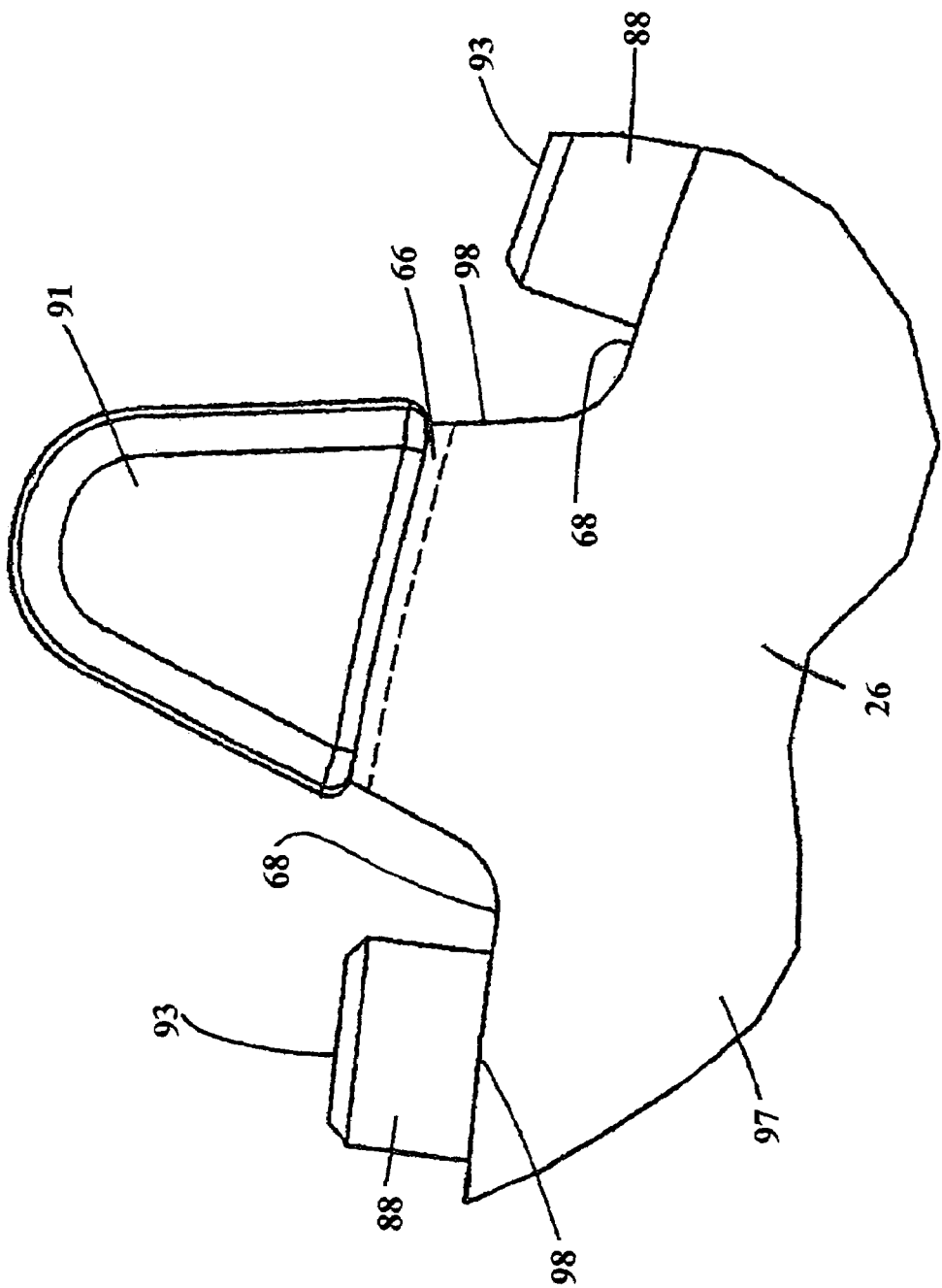
FIG. 12 is a fragmentary side elevation of the wheel of FIG. 11.

FIGS. 11 and 12 show an alternate wheel 26 which includes a radially-extending portion (or wall) 97, having inner and outer surfaces. Radially-extending portion 97 terminates in a circumferential edge 98, where a peripheral portion of wheel 26 is affixed thereto. The peripheral portion of wheel 26 includes a plurality of peripherally-spaced cross-members 88 which are affixed (welded) to recessed portions 68 of circumferential edge 98. Cross-members 88 form outwardly-facing lug-engaging surfaces 93, which are positioned for engagement with distal ends 64 of track lugs 91.

Spaced inwardly from radially-extending portion 97 and parallel thereto is a rigidity ring 87 which has an outward edge 67 which is parallel to and spaced from circumferential edge 98. Cross-members 88, in addition to being welded to recessed portions 68 of circumferential edge 98, are welded to corresponding recessed portions of rigidity ring 87. Cross-members 88 span the space between rigidity ring 87 and radially-extending portion 97, and such space facilitates removal of accumulated debris (e.g., mud) from between wheel 26 and flexible track 22 during operation. Cross-members 98, radially-extending portion 97 and rigidity ring 87 are positioned and dimensioned such that there are substantial open spaces for removal of mud and other debris. The substantial openness along the peripheral portion of wheel 26 is a significant advantage.

Circumferential edge 98, in addition to including recessed portions 68, has intervening extended portions 66, and outward edge 67 of rigidity ring 87 has a precisely parallel shape. In other words, outward edge 67 and circumferential edge 98 are formed with alternating aligned pairs of extended portions and aligned pairs of recessed portions. As can be seen, not only are cross-members 88 each affixed (welded) to a pair of corresponding recessed portions, but radially-projecting drive members 230 are each affixed (welded) to a pair of corresponding extended portions. As noted above, this facilitates manufacture of wheel 26.

As can be seen, wheel 26 is free of side structure. That is, wheel 26 is free of side structure in positions which are both laterally adjacent to cross-members 88 (i.e., laterally adjacent, not circumferentially adjacent), at positions between adjacent pairs of drive members 91 and radially beyond circumferential edge 98 of radially-extending portion 97 of wheel 26. As already noted, this serves to minimize or substantially eliminate harmful torsional forces.

Wheel 26 of track apparatus 20 fully engages distal end surface 64 of track lugs 90 in order that track lugs 90 are supported when driven by wheel 26. This full engagement of track 22 tends to minimize shearing forces on track lugs 90 and the possible twisting and turning of such lugs. Thus, damage to track lugs during operation of track apparatus 20 is reduced, significantly extending belt life.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

The invention claimed is:

1. An earth working scraper comprising:
   a scraper blade for scraping earth from a ground surface;
   a receiving area located proximate the blade for receiving earth scraped from the ground surface by the blade;
   a rotatable axle for providing movement of the scraper to allow the blade to scrape the earth, the axle connected with respect to the blade and receiving area; and
   a track apparatus connected with respect to the rotatable axle, the track apparatus including:
      a continuous flexible track having an upper length and a ground-engaging lower length and including an inner surface;
      an axle wheel mountable to the rotatable axle for rotational movement therewith, the axle wheel engaging the inner surface of the flexible track along the upper length to drive the flexible track in response to rotation of the axle; and
      a frame for mounting the axle wheel,
   wherein the scraper has a first end adapted for attachment to a second scraper and a second end including the rotatable axle, the second scraper being independently powered or towed by a prime mover.

2. An earth working scraper comprising:
   a scraper blade for scraping earth from a ground surface;
   a receiving area located proximate the blade for receiving earth scraped from the ground surface by the blade;
   a rotatable axle for providing movement of the scraper to allow the blade to scrape the earth, the axle connected with respect to the blade and receiving area; and
   a track apparatus connected with respect to the rotatable axle, the track apparatus including:
      a continuous flexible track having an upper length and a ground-engaging lower length and including an inner surface;
      an axle wheel mountable to the rotatable axle for rotational movement therewith, the axle wheel engaging the inner surface of the flexible track along the upper length to drive the flexible track in response to rotation of the axle;
      a frame for mounting the axle wheel;
      an idler assembly having an idler wheel engaging the track, the idler assembly being moveable with respect to the frame; and
      a tensioning device for maintaining tension on the continuous flexible track, the tensioning device comprising:
         a main-cylinder housing interconnected to one of the frame and the idler assembly, the housing extending along an axis and defining a main chamber therein;
         a main piston having a first end operatively connected to the other of the frame and the idler assembly and a second end slidably received within the chamber, the piston movable between a retracted position and an extended position;
         a primary dampening structure for resisting movement of the piston toward the retracted position for a first predetermined axial length; and
         a secondary dampening structure for resisting movement of the piston toward the retracted position for a further axial length beyond the first predetermined axial length, the secondary dampening structure resisting movement of the piston independent of the primary dampening structure.

3. The scraper of claim 2 wherein the primary dampening structure includes:
a primary cylinder extending along an axis and defining a primary chamber therein; and
a primary piston slidably received in the primary cylinder and movable axially between a first and second position, the primary piston dividing the primary chamber into a first portion for receiving a pressurized gas and a second portion.

4. The scraper of claim 3 wherein the secondary dampening structure includes:
a secondary cylinder extending along an axis and defining a secondary chamber therein; and
a secondary piston slidably received in the secondary cylinder and movable axially between a first and second position, the secondary piston dividing the secondary chamber into a first portion for receiving a pressurized gas and a second portion; whereby the conduit interconnects the main chamber and the second portion of the secondary chamber and wherein the hydraulic fluid is disposed within the second portion of the secondary chamber.

5. The scraper of claim 4 wherein the pressure of the pressurized gas in the first portion of the secondary chamber is greater than the pressure of the pressurized gas in the first portion of the primary chamber.

6. The scraper of claim 5 wherein the primary and secondary dampening structures operate to progressively increase resistance to movement of the idler wheel toward the deflected position as the idler wheel moves toward the deflected position.

7. The scraper of claim 2 wherein the dampening structures are mounted at a position remote from the housing and piston.

8. An earth scraper comprising:
a scraper blade for scraping earth from a ground surface;
a receptacle for receiving the earth scraped by the scraper blade;
an axle for carrying the scraper blade and receptacle;
a rotatable axle wheel connected to the axle and having a plurality of spaced-apart drive members along a circumferential edge thereof;
a track having lugs formed along an inner surface thereof, the lugs being configured for meshing engagement with the drive members of the wheel;
an idler wheel tensioned against the inner surface of the track; and
a tensioning device for applying tensioning of the idler wheel against the inner surface of the track, the tensioning device including primary and secondary dampening chambers, the primary dampening chamber including a limiter operative to limit a first range of dampening of the tensioning.

9. An earth working scraper comprising:
a pan structured for being lowered into or raised out of contact with a ground surface, the pan having an interior portion, the pan comprising:
a scraper blade structured for scraping earth from the ground surface; and
a receiving bin formed in the interior portion adjacent to the scraper blade, the receiving bin for receiving and holding a volume of the earth scraped by the scraper blade;
an axle for carrying the pan;
a rotatable axle wheel connected to the axle and having a plurality of spaced-apart drive members along a circumferential edge thereof; and
a track having lugs formed along an inner surface thereof, the lugs being configured for meshing engagement with the drive members of the wheel,
wherein the pan further comprises a selectively openable door disposed proximate the scraper blade.

10. An earth working scraper comprising:
a pan structured for being lowered into or raised out of contact with a ground surface, the pan having an interior portion, the pan comprising:
a scraper blade structured for scraping earth from the ground surface; and
a receiving bin formed in the interior portion adjacent to the scraper blade, the receiving bin for receiving and holding a volume of the earth scraped by the scraper blade;
an axle for carrying the pan;
a rotatable axle wheel connected to the axle and having a plurality of spaced-apart drive members along a circumferential edge thereof; and
a track having lugs formed along an inner surface thereof, the lugs being configured for meshing engagement with the drive members of the wheel,
wherein the primary dampening chamber includes a limiter operative to limit a first range of dampening of the tensioning.

11. An earth working scraper comprising:
a scraper pan structured for being lowered into or raised out of contact with a ground surface, the scraper pan having an earth-holding area formed as a bin and having a scraper blade, the bin having an essentially horizontal bottom surface and an opening in a wall thereof, the scraper blade being incorporated into the essentially horizontal bottom surface of the bin and being disposed adjacent the opening in the wall of the bin;
an axle adapted for carrying the scraper pan;
a rotatable axle wheel connected to the axle and having a plurality of spaced-apart drive members along a circumferential edge thereof; and
a track having lugs formed along an inner surface thereof, the lugs being configured for meshing engagement with the drive members of the wheel.

12. The earth working scraper of claim 11, wherein the pan further comprises a selectively openable door disposed proximate the scraper blade.

13. The earth scraper of claim 11, further comprising an idler wheel tensioned against the inner surface of the track.

14. The earth scraper of claim 13, further comprising a tensioning device for applying tensioning of the idler wheel against the inner surface of the track, the tensioning device including primary and secondary dampening chambers.

15. The earth scraper of claim 14 wherein the primary dampening chamber includes a limiter operative to limit a first range of dampening of the tensioning.

* * * * *

UNITED STATES PATENT AND TRADEMARK OFFICE
CERTIFICATE OF CORRECTION

PATENT NO. : 7,077,216 B2  Page 1 of 1
APPLICATION NO. : 10/690337
DATED : July 18, 2006
INVENTOR(S) : Kenneth J. Juncker It is certified that error appears in the above-identified patent and that said Letters Patent is hereby corrected as shown below:

Column 11, line 21, delete "91" and insert --90--.
Column 11, line 45, delete "230" and insert --91--.

Signed and Sealed this

Fifth Day of October, 2010

David J. Kappos
*Director of the United States Patent and Trademark Office*